G. H. & S. Ferguson.
Paper Feeding Mach.
No. 1046. Reissued Sept. 25. 1860
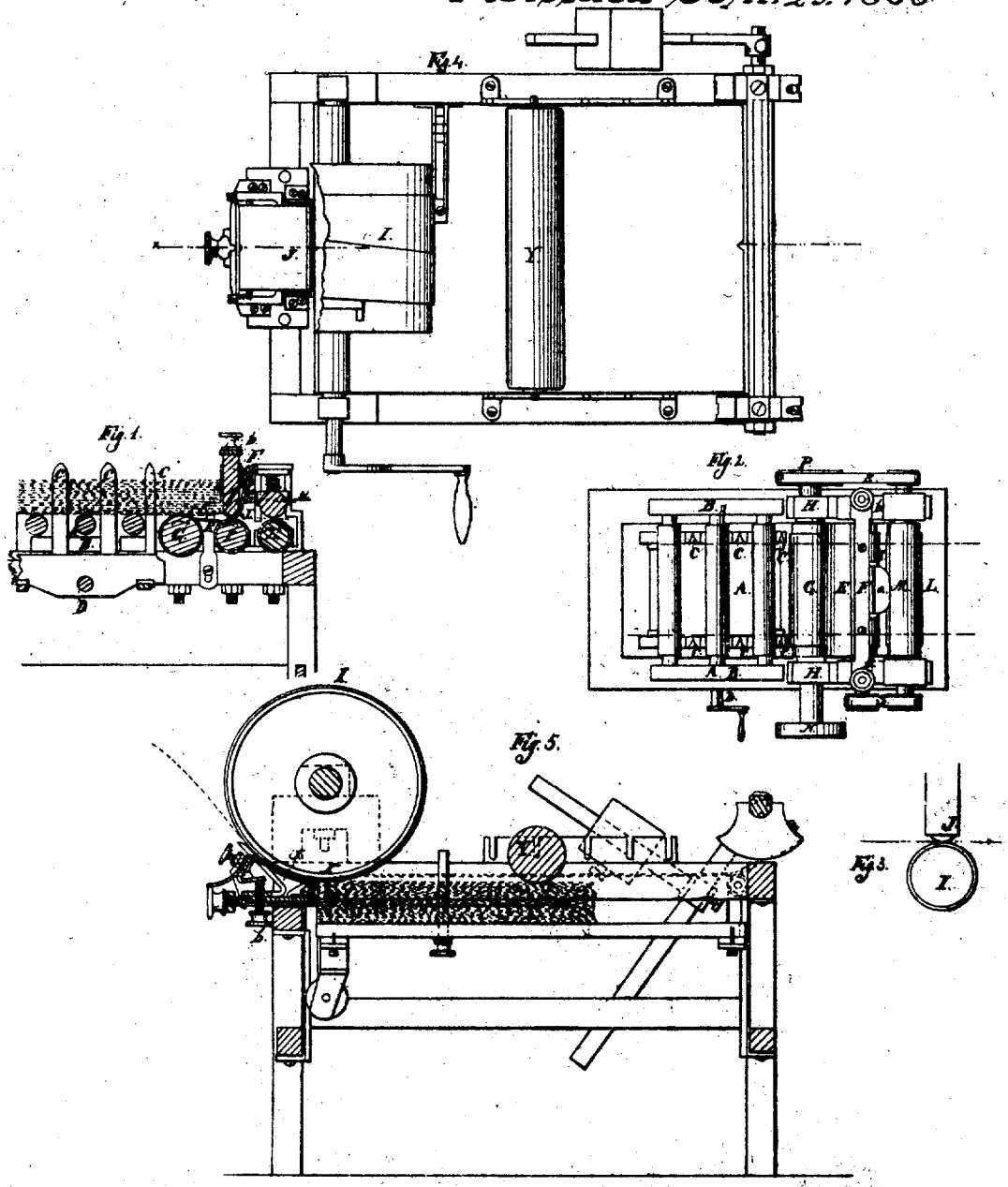
Witnesses
J. W. Coombs
R. S. Spencer
Inventors
G. H. Ferguson
S. Ferguson
per Munn & Co
attorneys

UNITED STATES PATENT OFFICE.

SYLVESTER FERGUSON AND GEORGE H. FERGUSON, OF MALDEN BRIDGE, NEW YORK.

MACHINE FOR FEEDING PAPER TO PRINTING-PRESSES.

Specification forming part of Letters Patent No. 24,861, dated July 26, 1859; Reissue No. 1,046, dated September 25, 1860.

*To all whom it may concern:*

Be it known that we, GEORGE H. FERGUSON and SYLVESTER FERGUSON, both of Malden Bridge, in the county of Columbia and State of New York, have invented a new and useful Improvement in Machines for Feeding Paper to Printing-Presses, Ruling-Machines, &c.; and we do hereby declare that the following is a full, clear, and exact description thereof, reference being had to the accompanying drawings, making part of this specification, in which—

Figure 1 represents a longitudinal vertical section taken centrally through the machine, showing the several parts in their respective positions for feeding the paper. Fig. 2 shows a plan view of the machine. Fig. 3 is a detached and enlarged view of the feed-wheel and friction-rubber, showing the operation of feeding the paper between the same. Fig. 4 shows a plan view of a machine where the feed-wheel is placed over the rubber, in which case one of the feed-rollers is dispensed with and the sheets of paper are drawn from the top of the pile, instead of from the bottom. Fig. 5 is a longitudinal section of Fig. 4, taken in the vertical plane indicated by red line *x x* in Fig. 4.

Similar letters of reference indicate corresponding parts in the several figures.

Our invention consists in combining one or more friction feed-rollers, drums, or cylinders with an adjustable friction-stop or stationary piece of rubber or its equivalent, arranged in such a relation to a table for holding the sheets of paper, as will be hereinafter described, that sheets of paper of any size, texture, or thickness, either wet or dry, will be drawn regularly and speedily from the pile, one at a time, between the feed-roller and friction-stop.

To enable those skilled in the art to make and use our invention, we will proceed to describe its construction and operation.

The blank paper, which is to be passed through the machine in single sheets, is placed upon the table A, as represented by red lines, Fig. 1, which table consists of a number of horizontal rollers having their bearings in two longitudinal bars, B B, so that the sheets of paper may be drawn over them with less friction. Between these rollers are perpendicular fingers C, which are made laterally adjustable by a right-and-left screw, D. These fingers serve to keep the pile of paper in a proper position upon the table, so that it will be presented straight to the feeders. The pile of paper is laid upon this table with the front edges resting upon a metal guard or guide plate, E, and fitting closely against the adjustable frame F.

In front of the table above described is a feed-roller, G, having its bearings in adjustable journal-boxes H H, and rotated in the direction of the arrow, Fig. 1. The surface of this feed-roller is covered with india-rubber or other suitable material for creating sufficient friction upon the under sheet of the pile of paper to carry it forward between a smaller roller, I, covered in like manner, and a friction-stop, J, which is stationary, and which may also be made of india-rubber. This friction stop-piece is fixed to a vertically-adjustable frame, F. The arrangement of it is shown in Figs. 1, 2, and 3. It consists of a sheet of rubber or like material, passed from one side of the frame F through a mortise and under the frame, where it is held by a key or wedge, *a*. This rubber or friction stop J is adjusted by set-screws *b b* to the periphery of the roller I, so that it will just touch or slightly press upon its surface and create a proper degree of friction to prevent two sheets of paper passing through, but at the same time to allow the edges of two sheets to pass between the rubber stop and roller I.

The lowest sheet from the pile of paper having been fed upon the surface of roller I, by feed-roller G or by any other substantial means, the sheet is momentarily stopped by the fixed rubber stop J until the next lowest sheet in the pile is fed up between the rubber and the lowermost sheet. This upper sheet then passes between the lower sheet and rubber stop J, and forms a smooth surface for the lower sheet to pass under as the friction-roller I impels it forward and discharges it on the opposite side of the machine. At the instant this sheet leaves the roller I the next succeeding sheet is acted upon by the roller and impelled forward, while the one above it is checked by the rubber stop I, and destroys the friction of its surface upon the lower sheet, and soon the same operation is repeated until the pile of paper has been fed through the machine, between roller I and friction-stop J, a single sheet at a time.

As each sheet of paper passes from the roller I and stop J, it is caught between rollers L M and delivered from the machine. The lower roller, L, is a covered or friction roller, while the upper one, M, has a smooth surface, which is held down upon the surface of roller L by springs *c*, that press upon its journal-boxes.

This machine may be driven at any ordinary speed, depending, of course, upon the purposes to which it is applied. The motive power is communicated to a pulley, N, on the shaft of feed-roller G, and from this roller transmitted to rollers I L by a large pulley, P, on the opposite end, over which passes a belt, R, which is carried to a pulley on the shaft of roller L. This roller then gives motion to roller I by a belt, S. Thus the rollers have a uniform speed.

The several parts above described are supported upon a suitable frame, and are made adjustable to the different sizes and thicknesses of paper to be fed through the machine, and to suit the various circumstances attending the feeding of paper.

In order to feed the sheets of paper from the top of the pile, instead of from the bottom, the roller G is dispensed with, and the pile of sheets is laid on a table, (shown in Figs. 1 and 2,) which table may be acted upon by suitable springs or weights, or in any suitable manner to keep the top sheet of the pile always pressed against the roller I, which in this case is made much larger than the roller I in Figs. 1, 2, and 3. This roller then carries the top sheet forward and over the friction stop J, which is placed under the roller I and held and adjusted substantially in the manner as the stop J. (Shown in Figs. 1, 2, and 3.)

The operation of the rubber stop J and feed-roller I in this latter instance is substantially like that shown in Figs. 1, 2, and 3, and with this machine the roller G and anti-friction table are dispensed with, making the one feed-roller, I, serve the purpose of the feed-roller G for drawing sheets from the pile to the rubber stop J.

The loose yielding roller Y (shown in Figs. 4 and 5) is used merely as a weight for keeping the sheets down straight while they are being fed from the pile.

Having thus described our invention, what we claim as new, and desire to secure by Letters Patent, is—

1. Feeding single sheets of paper to a printing-press, paper-ruling or other machine requiring the feed of a single sheet at a time, by means of the feed-roller I and friction-stop J, or the equivalents thereof, when the same are arranged and combined essentially as set forth.

2. In combination with the roller I and friction-stop J, the feed-roller G or its equivalent, substantially as described, for the purposes herein set forth.

GEO. H. FERGUSON.
SYLVESTER FERGUSON.

Witnesses for G. H. Ferguson:
RUSSEL D. ASHLEY,
CHARLES W. LIPPITT.

Witnesses for S. Ferguson:
PORTER UNDERWOOD,
WM. D. HILL.